Dec. 31, 1929. C. H. BISSELL 1,741,358
COUPLING FOR CONDUIT OUTLET BOXES
Filed June 20, 1923
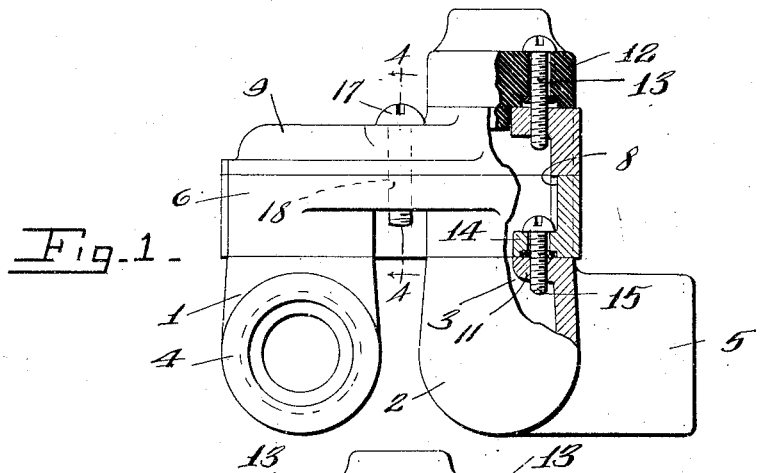
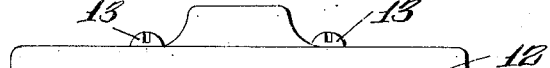
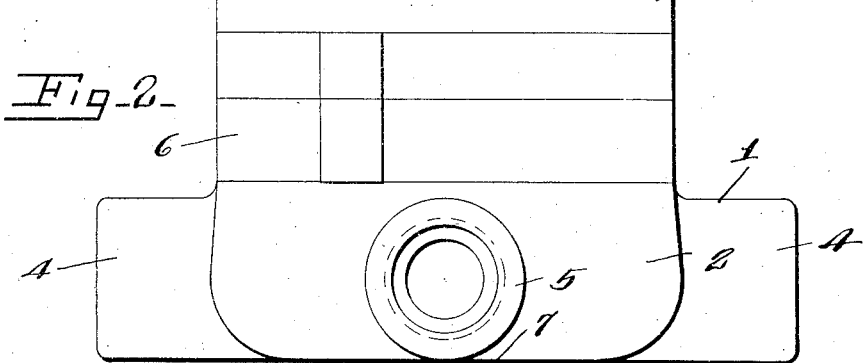
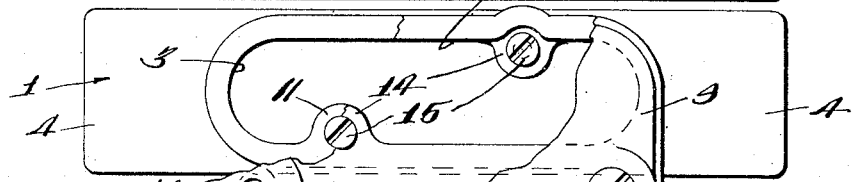
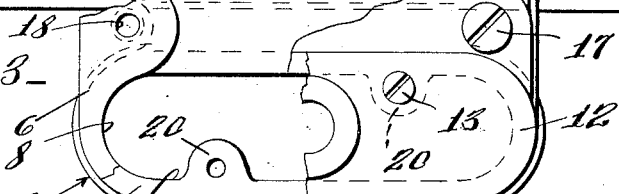
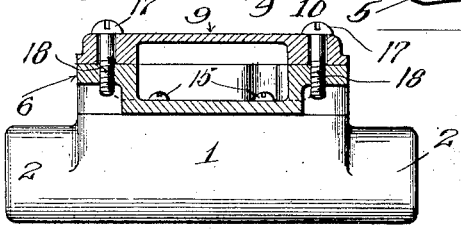

Patented Dec. 31, 1929

1,741,358

UNITED STATES PATENT OFFICE

CARL H. BISSELL, OF SYRACUSE, NEW YORK, ASSIGNOR TO CROUSE-HINDS COMPANY, OF SYRACUSE, NEW YORK, A CORPORATION OF NEW YORK

COUPLING FOR CONDUIT OUTLET BOXES

Application filed June 20, 1923. Serial No. 646,541.

This invention relates to electrical conduit work, and has for its object a particularly simply and efficient means for coupling conduit outlet boxes together for extending a branch conduit system from a conduit outlet box.

The invention consists in the novel features and in the combinations and constructions hereinafter set forth and claimed.

In describing this invention, reference is had to the accompanying drawing in which like characters designate corresponding parts in all the views.

Figure 1 is an elevation of two conduit outlet boxes with this coupling or connector applied thereto.

Figure 2 is an elevation taken at a right angle to Figure 1.

Figure 3 is a plan view of the outlet boxes with the connector applied thereto, the cover of the connector being broken away and the connector being partly broken away, exposing the open side of the underlying box, and also the appliance applied to the opening in the cover being broken away to expose the underlying opening in the cover.

Figure 4 is a fragmentary sectional view on line 4—4, Fig. 1.

This invention comprises a connector mountable on the open sides of two or more conduit outlet boxes and common to such boxes, and having passages therethrough alined with the openings of the boxes and also having means by which the connector is interchangeably mountable on the boxes with the appliances or covers usually mounted on such boxes. It further includes a cover for the connector, having one or more openings therein alined with one of the passages of the connector and designed to receive a cover or appliance which is interchangeably mountable on the box and the cover.

1 and 2 designate conduit outlet boxes which are here shown as elongated in form and formed with the openings 3 to which electric appliances or covers are usually applied, the boxes having means, as threaded nipples, to which the conduits are connected. The box 1 is here shown, as provided with such nipples 4 at its opposite ends, and the box 2 with the nipple 5 extending laterally therefrom. 6 is the connector or coupling common to both boxes. The connector is mountable upon the open sides of the boxes and has openings 7 and 8 therethrough alined with the openings 3 of the boxes. The connector is in the form of a shallow box having an open top and passage in its bottom.

9 designates a cover for the upper side of the connector or coupling 6, the cover here illustrated having an opening 10 therein alined with the opening 3 of one of the boxes and the opening 7 or 8 of the interposed connector.

The conduit outlet boxes are usually provided with means by which the covers or appliances are attachable thereto and, as here shown, each box is formed with a pair of diagonally disposed perforated threaded lugs 11 on opposite sides of the opening in its open side, and its appliances as 12 are provided with screws 13 for threading into such lugs. The connector or coupling is attachable to these lugs 11 interchangeably with the covers and is provided with perforated unthreaded lugs 14 alined with the lugs 11 for receiving screws 15 passing through the lugs 14 and threading into the lugs 11.

9 designates the cover for the connector which is attachable to the connector as by screws 17 passing through the cover and threading into holes 18 located between the rounding ends of the passages 7 and 8 of the connector, it being understood that the openings 3 in the boxes and in the connector have rounding end walls, so that there is a widened space between the ends of the openings 7 and 8.

The cover 9 may be provided with one or more openings 10 alined with one of the openings of the conduit outlet box and the interposed passage of the coupling or connector, this opening being also formed with lugs 20 arranged diametrically, opposite each other similar to the lugs 11 for receiving the screws of an electrical appliance which is interchangeably mountable on the boxes 1 and 2.

In operation, when it is desired to extend the conduit system, the extension is placed in position, with the conduit outlet box 2 alongside one of the outlet boxes 1 in the main system. A coupling 6 is attached to the outlet boxes after the cover or other appliance is removed from the box 1 and the wires in the box 1 branched and the branches brought up out of the box 1 through the opening 7 and connected to the wires in the box 2 and what have been brought up through the passage 8 of the connector. The cover is then applied. The wires may be adaptably branched through the opening 10 and brought out through an appliance or cover mounted on the opening 10.

This coupling or connector is particularly advantageous in that it is readily applicable to standard conduit outlet boxes and provides a particularly simple and efficient means for extending the conduit system.

What I claim is:

1. The combination of a plurality of spaced apart conduit boxes each having an opening in its upper side, a connector box mounted on the open upper sides of the outlet boxes and bridging the same and having openings in its lower side alined with the open sides of the boxes and means for securing the connector box to the open sides of the outlet boxes, the connector box also having another upper opening for receiving electrical appliances.

2. The combination of a plurality of spaced apart conduit boxes each having an opening in its upper side, a connector box mounted on the upper open sides of the outlet boxes and bridging the same and having openings in its bottom alined with the open sides of the outlet boxes, a removable cover for the connector box, and means for securing the connector box to the upper open sides of the outlet box, said means being located within the connector box and the outlet boxes.

3. The combination with a plurality of spaced apart outlet boxes each having an opening on one side thereof for receiving appliances, a connector box bridging the outlet boxes and interchangeably mountable thereon with the appliances for the outlet boxes, an opening in the top of the connector box and a removable cover for closing the same, the connector box having passages alined with those of the outlet boxes and means for securing the connector box to the outlet boxes.

4. The combination of a plurality of spaced apart conduit outlet boxes, each having an opening in its top side, a connector box mountable on the open tops of the outlet boxes and bridging the same and having passages alined with and extending to the openings of the outlet boxes and a connecting passage, the connector box being open at its top, a cover for the open top, and means for securing connector box to the outlet boxes.

5. The combination of a plurality of spaced apart conduit outlet boxes, each having an opening in its top side, a connector box mountable on the open sides of the outlet boxes and bridging the same and having passages in its bottom alined with and extending into the openings of the outlet boxes and a connecting passage, the connector box being open at its top, a cover for the open top and means for securing connector box to the outlet boxes, the cover also having an opening for receiving an appliance.

6. The combination of a plurality of spaced apart conduit boxes, each having an elongated opening in one side thereof for receiving appliances, a connector box bridging the outlet boxes and interchangeably mountable thereon with the appliances for the outlet boxes, the connector box having passages alined with and connecting the openings in the outlet boxes, and an opening in the side opposite the passages and means located within the connector box to secure the same to the outlet boxes.

In testimony whereof, I have hereunto signed my name at Syracuse, in the county of Onondaga, and State of New York, this 25th day of May, 1923.

CARL H. BISSELL.